United States Patent [19]

Kerr

[11] Patent Number: 5,351,531
[45] Date of Patent: Oct. 4, 1994

[54] DEPTH MEASUREMENT OF SLICKLINE

[75] Inventor: Wayne L. Kerr, Stafford, Tex.

[73] Assignee: Kerr Measurement Systems, Inc., Stafford, Tex.

[21] Appl. No.: 58,225

[22] Filed: May 10, 1993

[51] Int. Cl.$^5$ .......................... E21B 47/00; G01B 7/04
[52] U.S. Cl. ........................................ 73/151; 33/702;
33/719; 33/720; 33/734; 33/735; 324/206;
374/49; 374/136; 374/186
[58] Field of Search .......................... 33/702, 713–716,
33/719, 720, 734, 735, 736; 73/151; 324/206;
374/49, 136, 186

[56] References Cited

U.S. PATENT DOCUMENTS

| | | | |
|---|---|---|---|
| 2,604,526 | 7/1952 | Basham et al. | 33/736 X |
| 3,067,519 | 12/1962 | Swift | 33/736 |
| 3,465,447 | 9/1969 | Bowers et al. | 33/735 |
| 3,465,448 | 9/1969 | Whitfill, Jr. | 33/735 |
| 3,490,150 | 1/1970 | Whitfill, Jr. | 73/151 |
| 3,490,286 | 1/1970 | Schwartz | 374/136 |
| 3,552,025 | 1/1971 | Whitfill | 33/735 |
| 3,566,478 | 3/1971 | Hurlston | 324/206 X |
| 3,753,294 | 8/1973 | Attalli et al. | 33/735 |
| 4,117,600 | 10/1978 | Guignard et al. | 33/735 |
| 4,179,817 | 12/1979 | Lavigne et al. | 33/129 |
| 4,461,015 | 7/1984 | Kulhavy | 33/719 X |
| 4,709,208 | 11/1987 | Kerr | 324/206 |
| 4,718,168 | 1/1988 | Kerr | 324/206 X |
| 4,776,098 | 10/1988 | Nelle | 33/702 |
| 4,852,263 | 8/1989 | Kerr | 324/206 X |
| 4,924,596 | 5/1990 | Vachon | 33/735 X |
| 4,949,469 | 8/1990 | Wachtler | 33/702 |
| 5,062,048 | 10/1991 | Coulter et al. | 364/422 |

Primary Examiner—James C. Housel
Assistant Examiner—Milton I. Cano
Attorney, Agent, or Firm—Donald H. Fidler

[57] ABSTRACT

A depth measuring system for a slickline utilized in a well bore operation where the slickline is in a non-slip relationship with the circumference of a calibrated measuring wheel and the revolutions of the wheel are utilized to provide a first length measurement. A load cell is provided to measure tension in the slickline so that length elongation of the slickline due to tension can be determined. A temperature differential determination is made so that corrections in length can be made for the temperature effects. The temperature differential can be temperature effects on the measuring wheel and/or temperature effects of the slickline in the well bore. The measuring wheel determination of length is algebraically summed with the tension elongation and changes due to temperature to provide a more accurate indication of the depth measurement in the well bore.

28 Claims, 3 Drawing Sheets

DEPTH MEASUREMENT OF SLICKLINE

FIELD OF THE INVENTION

This invention relates to depth measurements for slickline operations in a well bore, and more particularly, to a system for continuously determining and displaying accurate depth measurements for a tool suspended or moving in a well bore by a slickline.

BACKGROUND OF THE INVENTION

Depth measurements of a tool in a well bore are critical parameters. An oil well which traverses earth formations typically consists of a series of consecutively drilled and lined sections of borehole where each section is smaller in diameter than the next above section. The liner for each section typically is a tubular pipe string made up from lengths of steel pipe which are coupled to one another at tool joints. The lengths of steel pipe are more or less uniform. When a liner or liners are in the well bore, and cemented in place, the formation zones of interest are perforated to communicate with the well bore. In most instances, a production tubing with a production packer is utilized with the perforated liner. It is common to use one or more gas lift valves or other production devices disposed along the length of production tubing. Gas lift valves include plugs and chokes which are periodically manipulated by a slickline tool. The production string also can have downhole circulating and flow control devices.

Remedial and diagnostic operations conducted with a tool on a slickline typically involve a well tool passed through the production tubing string to the depth where the operation will be conducted. The operator locates the tool in the well bore at the desired depth by relying upon depth measurements obtained with a mechanical depth measuring device. The device utilizes a slickline wrapped around a measuring wheel and the revolutions of this wheel are correlated to depth and displayed on a recorder or depth gauge.

In logging open boreholes, most well tools for measuring well bore parameters are suspended and moved through the well bore on an electric wire line cable. The electric wire line is a composite structure containing electrical conductors in a core assembly which is encased in spirally wrapped armor wire. Depth of a well tool on an armored cable in a well bore is determined by utilizing predetermined magnetic marks located at regular intervals along the length of cable. The marks are detected by a magnetic mark detector and provide a basic depth measurement. The depth measurement is, however, typically adjusted for elongation due to cable stretch. In this type of system, the cable has an armored outer surface which is guided through tangential contact measuring wheels which tangentially engage the outer surface of the cable. Because of the cable construction, it cannot be wrapped around a measuring wheel and so there can be slippage in the wheel contact which results in an error in depth. U.S. Pat. No. 4,718,168 issued Jan. 12, 1988 illustrates and explains the effects of the various factors in depth measurement for an electric line cable.

Slickline well operations are quite different than electrical wireline operations. The slickline is a high quality length of wire which can be made from a variety of materials, (from mild steel to alloy steel) and typically comes in three sizes: 0.092; 0.108; and 0.125 inches in diameter. For larger sizes, a braided wire construction is utilized which is typically 3/16" or 7/32". The braided wire for all practical purposes has similar stretch characterized as a solid wire and is wrapped around the measuring wheel. Such braided wire is considered to be "slickline" herein. The slickline can be 10,000 feet or more in length. In a typical slickline operation, the speed of descent or ascend of the tool is at a high speed as compared to the speed of an electrical cable operation.

Heretofore, slickline depth measurements have only used a mechanical wheel measurement. Changes in tension in the slickline are monitored to indicate downhole tool engagement and disengagement.

The measuring wheel for a wheel measurement has a calibrated O.D. and the slickline is wrapped about or partially wrapped about the measuring wheel to prevent slippage. The measurement, however, obtained from a measuring wheel typically has an error factor in excess of 2 to 4 feet per 1,000 feet of length because of elastic stretch is not considered. Magnetic marks systems to measure stretch, such as disclosed in U.S. Pat. No. 4,718,168 have little application because magnetic marks, when placed on a slickline, quickly deteriorate as the wire is run in cased or completed wells.

A basic string of tools for a slickline operation typically includes a rope socket for connection to the end of the slickline, a weight or stem to assist descent into the wellbore by overcoming friction in a stuffing box or pack-off and the force of well pressure on the cross-sectioned area of the wire. Jars are also included (which can be mechanical or hydraulic) for providing downhole impact energy upon operation in a well bore. A universal or knuckle joint permits a flexible connection to the running or pulling tool to be used in the operations.

Pulling and running tools can also include battery operated service tools with recording memory means which collect fluid samples, measure pressure, measure temperature, gamma ray and flowmeter measurements, directional survey, diameter surveys and so forth as a function of time. With the present invention such tools can be correlated with respect to depth and time. Pulling and running tools are used in gas lift operations, downhole plugs and valve shifting, flow control devices, filling operations, pack off devices and so forth. In many situations, downhole profiles and landing nipples can be closely spaced to one another and difficult to locate depth wise. In other instances in the well, the location of perforations in the well bore or gas lifts and packers in the production tubing can be in error as to true depth. Heretofore, there has been no reliable way to determine any discrepancy in depth by use of a slickline.

In a slickline operation, the predominate factors affecting the depth measurement of a well tool suspended by a slickline are the elastic stretch, the temperature and the accuracy of the measuring wheel. When the well tool is moving, buoyancy and drag or lift affect the tension in the slickline and hence affect the depth measurement. The type of material and the cross-sectional area of the slickline will also affect the depth measurement.

A slickline as commonly acquired from a wire manufacturers will have a rated modulus of elasticity (sometimes called "stretch coefficient"). Stretch coefficients determined from short lengths of wire or slickline are not the same as the stretch coefficient for a long length of wire such as 10,000 to 15,000 feet. The stretch coefficient is also an average value and can vary from lot to lot of wire produced and is not specific to a particular slickline. Obviously, use of an inaccurate stretch coefficient in determining depth in deep wells can seriously affect the depth measurement.

The diameter of the measuring wheel will change in diameter under the effects of temperature. For example, in some environments a 70° change in temperature can occur in a 24 hour period. Such temperature changes seriously affect the depth measurement with a measuring wheel. Temperature changes also affect the wire length. Also, over time, the measuring wheel will build up surface film which can increase the diameter of the wheel, or the wheel will wear which decreases the diameter. Any chance in the calibrated wheel diameter affects the depth measurement.

Buoyancy and the lift/drag factors can be a significant factor. In going in, the weight and the stuffing box friction largely determine the descent velocity through the liquid in the well bore. In coming out of a well bore, the operator can pull the tool as fast as the strength of the slickline will endure. In reaching the desired depth and reversing the direction of motion, the slickline tension changes considerably and thus the stretch of the slickline varies before the motion of the tool is affected.

In considering the present invention, it is entirely possible that technology will develop future electrical wireline cable which can be wrapped or partially wrapped about a measuring wheel. In such case such wireline should be considered "slickline". The principal feature in wrapping slickline with respect to a measuring wheel is to increase the area of contact and thus increase the friction between the slickline and the measuring wheel and eliminate slippage of the wireline relative to the measuring wheel. Slippage is an inherent defect in tangential contact measuring wheels.

SUMMARY OF THE INVENTION

The present invention is embodied in a depth measurement system for a slickline operation in a well bore which traverses earth formations. The slickline is on a drum or spool and has a non-slip relationship to a calibrated measuring wheel. The non-slip relationship is typically obtained by either a full or a partial wrap of the slickline relative to measuring wheel or wheels. The slickline is coupled to a well tool in the well bore. The system has an input for slickline length in the well bore represented by revolutions of the measuring wheel, an input for ambient temperature at the well site, an input for well bore temperature, and an input for tension in the slickline.

Changes in length of the slickline in a well bore are due to elastic stretch, the temperature effect on the measuring wheel, the temperature effect on the slickline and inaccuracies in measuring tension. Correction for elastic stretch is a major component of correction required to reduce depth error. Correction of length change due to surface temperature and downhole temperature each affect the error in depth measurement and one or both can be corrected with respect to depth measurement.

Ambient temperature at the well site and the temperature response characteristics of the measuring wheel are correlated to develop a wheel depth correction in depth (length of slickline) for temperature effects on the measuring wheel. Tension in the slickline is utilized to develop a tension correction in depth (length of slickline) due to tension and the tension correction is combined with the wheel depth correction to develop a corrected depth measurement. A temperature correction for temperature effect on the slickline in the well bore can also be utilized in the corrected depth measurements.

The system utilizes a first CPU means programmed for continuously processing the input data on a periodic basis and for obtaining periodic determinations of tension and corrected depth which are stored in a memory.

A second CPU means is programmed to determine line speed from the change in depth as a function of time and processes the tension and corrected depth measurements on a periodic bases suitable for visual displays, for serial modem transmissions and for recording devices. The second can CPU operate on a slower basis to adjust to the displays and readouts while the 1st CPU can operate at a much higher periodic rate for more accurate resolution of the measurement data.

The system is also utilized in determining the stretch coefficient of the slickline in use at the time the slickline is in the wellbore. This downhole determined stretch coefficient is utilized to update the stretch coefficient for calculating stretch of the slickline to optimize the accuracy of depth measurement. By utilizing the downhole determined stretch coefficient, the accuracy of the stretch coefficient value for determining depth is enhanced.

The system has a selection input to calibrate the depth measurements to the wire size and wire weight and to adapt the measurements to various types of recorders.

The algorithms for determining the depth corrections are set forth in the text of the specification.

DESCRIPTION OF THE INVENTION

Figure 1:
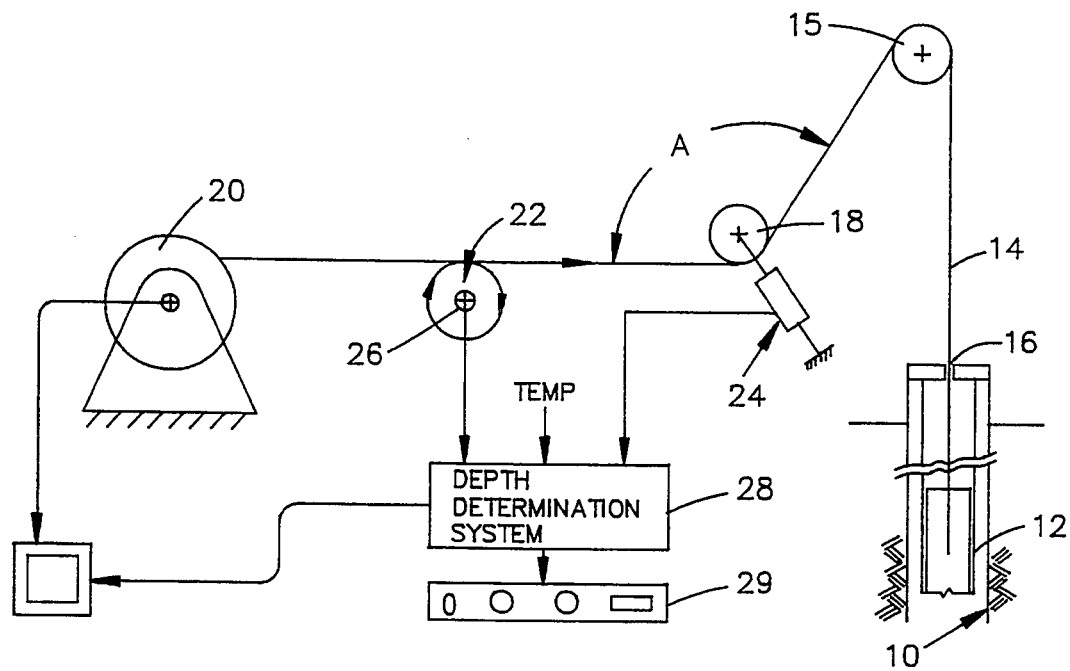
FIG. 1 is a schematic representation of an overall system embodying a system for depth measurement of a slickline.

Referring now to FIG. 1, a wellbore 10 is illustrated as traversing earth formations. A string of tools 12 is attached to the end of a slickline 14 for movement into and out of the wellbore 10. The slickline passes through a stuffing box 16 and is passed over a rig top sheave 18 to a lower pulley sheave 18 to a wireline drum 20 for the slickline. The slickline 14 is wrapped or partially wrapped around a calibrated measuring drum or wheel 22 (so it won't slip) and the pulley shears 18 is connected to a tension load cell 24. The measuring wheel 22 has an electrical counter 26 which develops a pulse output as a function of revolution of the wheel 22. The counter 26 provides a set of pulses for "up" motion (rotation in one direction) and a set of pulses for a "down" motion. The tension load cell 24 provides an analog signal which is a function of tension of the slickline.

In the present invention, the pulse input from rotation of the measuring wheel 22, the tension load input from the load cell 24, an ambient temperature input, and a downhole temperature input are provided to a depth determination system 28. The depth determination system 28 is connected to a display and control panel 29. The depth determination system 28 provides a corrected depth input (via 31) to a recorder and to provide a true depth determination of the length of slickline or the depth of the tool in the well bore. The depth determination means 28 includes processor means for receiving inputs and for processing algorithms to derive various depths and depth related parameters.

Wheel Depth Determination

Figure 2:
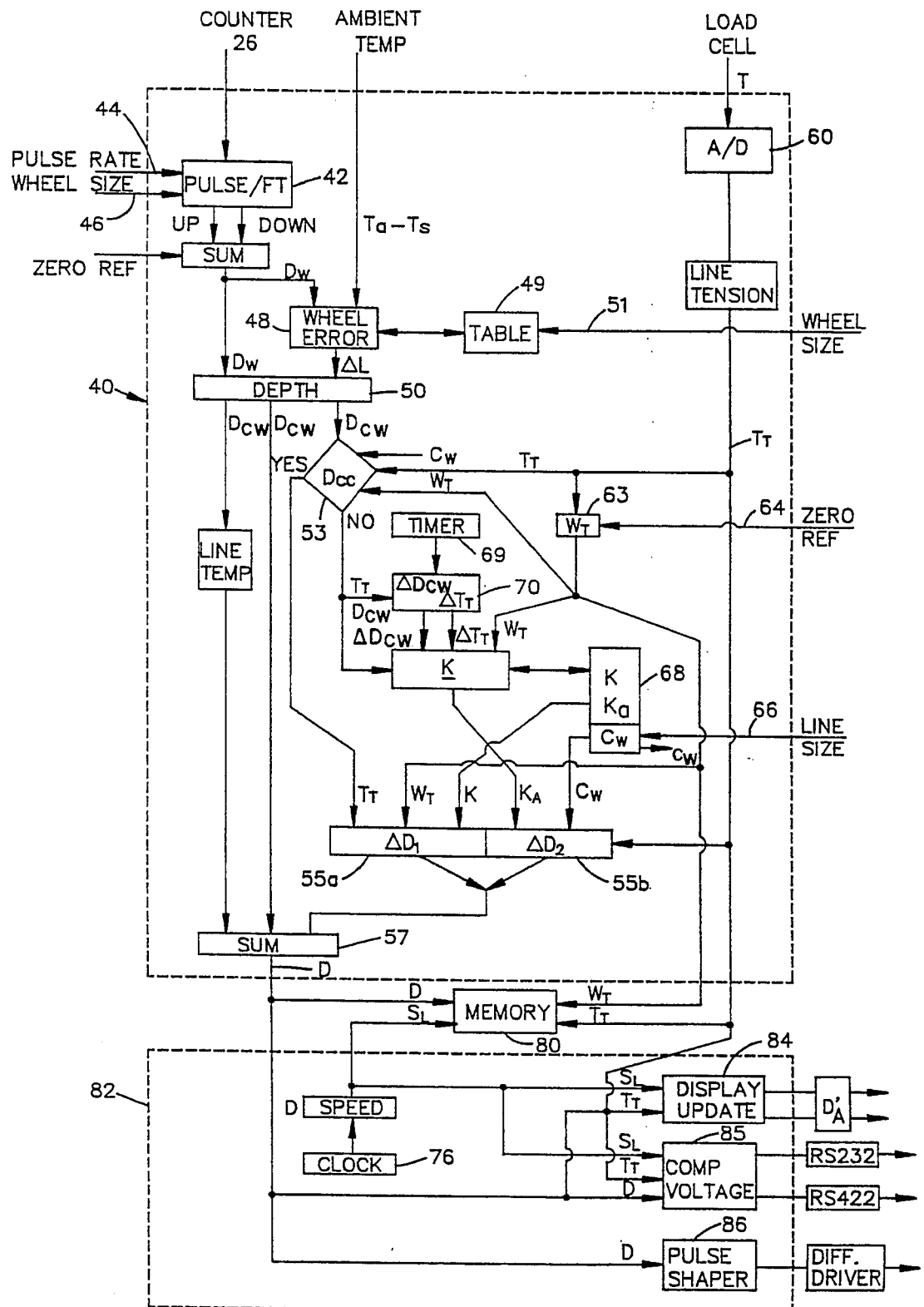
FIG. 2 is a schematic representation of the system and programming for determine depth of a well tool for a wireline.

A correction for depth error in the slickline due to temperature changes in a measuring wheel 22 is determined. Referring now to FIG. 2, a set of pulses from the counter 26 are supplied to a first CPU means 40 (shown in dashed line). The CPU means 40 is programmed to perform certain functions which includes converting the pulses from the encoder or counter 26 to a format for acceptance by various types of recorders. For example, recorders can operate on a format of 150 pulses/foot or 100 pulses/foot and so forth.

The conversion determination 42 is controlled by a pulse rate selection input 44 and a wheel size selection input 46. For example, if the counter 26 supplies a pulse rate of 600 pulses/revolution and the circumference of the wheel is 4 feet and a format based on 150 pulses/foot is desired, then with a pulse rate selection input (46) for 4 foot wheel size, the conversion determination 42 provides a standard for the recorder of 150 pulses equal to one foot of slickline travel.

The pulse/foot determination is continuously algebraically summed with respect to a zero/depth reference point to provide a total pulse count which is representative of the depth ($D_w$) in feet. The zero reference point is an initial selection input 49 and resets the system to a zero/depth reference point. The reason for this is that each well has its own reference zero point and thus the tool on the slickline can be referenced exactly to the zero depth/reference point of the well.

The change in depth ($\Delta L$) of the slickline due to ambient temperature changes in the measuring wheel are determined by use of the following formula:

$$\Delta L = (T_A - T_S) * D_W * K_W \quad (1)$$

where $\Delta L$ is the change in wire length as a function of temperature (feet)

$T_A$ is ambient temperature in °F.

$D_W$ is the depth in feet $K_W$ is the temperature coefficient of the selected measuring wheel, FT/FT/°F.

$T_S$ is the wheel standard temperature of calibration used by a manufacturer.

The determination is a function 48 which receives a value for the ambient temperature (less standard wheel temperature), the measured depth value $D_W$ and the temperature coefficient $K_W$ from a table 49 of $K_W$ values. The proper $K_W$ for a given wheel is obtained by use of a wheel size selection input 51.

The temperature correction for the measuring wheel is an important factor in this invention. The measuring wheel is manufactured to provide a defined measurement length of slickline per revolution of the measuring wheel at some "given" temperature. Unfortunately, in field conditions, a "given" temperature may not exist as the field temperatures can range from well below zero degree Fahrenheit and greatly above an ambient temperature (usually 70°) at a manufacturing site. The temperature differential produces a change in size (diameter) in the measuring wheel which seriously offsets the depth measurement.

The wheel depth measurement ($D_W$) is adjusted to compensate for a length change $\Delta L$ due to ambient temperature of the measuring wheel at the well site. The adjustment in length is made by combining the length change $\Delta L$ due to temperature with the depth measurement $D_W$ and either adding or subtracting pulses to obtain a corrected wheel depth measurement ($D_{CW}$) for changes in length due to temperature of the measuring wheel. The summation determination 50 provides a corrected wheel depth measurement $D_{CW}$.

Tension Depth Determination

Each slickline has its own characteristics in respect to elastic stretch. The given elastic stretch coefficient "K" for a slickline which is calculated by using Young's Modulus of Elasticity for each of the line sizes for a given material is not accurate. Young's Modulus (K) is defined as:

| | |
|---|---|
| $K$ = the stress divided by strain in psi. or; | 2(a) |
| $K$ = (force/area of wire/$\Delta L/L$) or: | 2(b) |
| $K$ = 1/Youngs' Modulus * (wire area) | 2(c) |

It is well known however, that manufacturing diameter tolerance, wear, pulling beyond yield, etc. causes changes in the cross-sectional area of a slickline throughout its length. Thus, classic calculations using Young's Modulus or lab testing on short lengths will not provide a true value of "K" for a long length of slickline such as 10,000 or 15,000 feet. Moreover, wire drag, buoyancy effects and extreme drag (twisting and angular direction changes in boreholes) complicate a prediction of a proper "K" value.

In the present invention, to obtain a proper value of "K" in each application, the value of "K" is determined for the slickline in use at the time of use. This proper value of "K" is referred to herein as the "apparent" elastic stretch coefficient $\underline{K}$.

To obtain the apparent elastic stretch coefficient $\underline{K}$, the tool is run in the borehole to a desired depth where the K value is to be determined. The tool has a pulling tool on the end of the slickline where the pulling tool can be locked to a gas lift valve or the like. With this arrangement the "apparent" elastic stretch coefficient $\underline{K}$ is measured directly by measuring stress (line tension) and strain (elongation) in the well bore for the particular length of slickline in the well bore at the time in question.

By use of the stretch coefficient K, the tension T on the slickline and the depth of the slickline, the change in length due to tension can be determined.

The tension value is obtained from the load cell 24 (FIG. 1) which provides an analog signal representative of the tension "T" in the slickline. The analog signal is converted to a digital representation (See 60) in the CPU means 40 and the tension value T is utilized to determine the true line tension $T_T$ is determined by use of the following formula:

$$T_T = L/2(1 - \cos(A/2)) \quad (3)$$

Where $T_T$ is actual line tension in pounds;
L is the total load measured by the load cell 24 in pounds; and
A is the included rig-up angle (See FIG. 1)

By determining the included rig angle "A", any error in the tension value due to the positioning angle of the slickline to the load cell is corrected.

Before the tool is run in the well bore, the tool weight $W_T$ (See 63) is determined or defined by recording the value of the line tension $T_T$ with a zero depth reference selection input 64.

Values of the stretch coefficient K of the slickline for various line sizes and the weight/foot values $C_W$ for various line sizes are contained in a data table 68. The slickline size selection input 66 is provided to the table 68 in the CPU means 40 to select appropriate data for each line size as a function of weight/foot $C_W$ and the stretch coefficient K.

With the forgoing background in mind, the tool must initially be run in the well bore and is freely suspended. While the tool is run in the well bore, the selected line size input 66 and values of K for the slickline are utilized to determine the change in length $\Delta D$ in the slickline (See 55a) due to tension by using the formula:

$$\Delta D_1 = K D_{CW}/2(T_T + W_T) \quad (4)$$

Where $\Delta D_1$ is the change in length of the slickline;
$D_{CW}$ is the depth;
K is the elastic stretch coefficient of the slickline;
$T_T$ is the tension; and
$W_T$ is the tool weight The value of depth $D_{CW}$ is corrected for wheel temperature error. The determination of $\Delta D_1$ or $\Delta D_2$, is selected by a decision block 53 whenever the tension value $T_T$ is equal to the aggregate sum of the tool weight and the cable weight at the depth in question. If the tension value $T_T$ is equal to the aggregate of the tool weight and the cable weight, the tension value ($T_T$) is utilized by a "YES" decision for a determination, $\Delta D_1$ (See 55a) with the values of K (supplied from the table 68). The value of the tool weight $W_T$ and depth $D_{CW}$ are also used in the determination of $\Delta D_1$.

The value of the change of length ($\Delta D_1$) is algebraically summed with the value of depth $D_{CW}$ (See 57) and thus obtains a corrected depth value D.

Use of Apparent Coefficient K

A more accurate change in depth value ($\Delta D_2$) can be obtained in the following manner:

After the tool has been run in the well bore, the tool is locked to the gas lift or other device and tension on the slickline is increased. The operator observes a tension meter for a sharp increase in tension while moving in the "up" direction which is a positive indication that the tool is locked in the desired place. When the tool is locked in place, the tension value of $T_T$ is such that:

$$T_T > (C_W * D_{CW}) + W_T \quad (5)$$

where $C_W$ is the cable weight in pounds/foot;
$D_{CW}$ is the depth in feet; and
$W_T$ is the tool weight in pounds.

When the tension value $T_T$ sharply increases for a tool latched in the well bore, as compared to a tool not latched or freely suspended in the well bore, the decision block 53, by a "NO" decision, permits utilization of the $T_T$ value and the depth value $D_{CW}$ to determine change in depth values ($\Delta D_{CW}$ and change in tension values ($\Delta T_T$). That is, the tension will increase while the wheel depth measurement changes. With the change in wheel depth measurement ($\Delta D_{CW}$) and the change in tension ($\Delta T$), the apparent coefficient of stretch $\underline{K}$ can be determined. The determination of $\Delta T_T$ and $\Delta D_{CW}$ is made (See 70) at 2 second intervals for example as controlled by a timer function 69 to obtain values of $\Delta D_{CW}$ and its corresponding $\Delta T_T$ for the same time interval. The inputs of depth ($\Delta D_{CW}$) and $\Delta T_T$ are combined with the depth value ($D_{CW}$) to calculate a coefficient of stretch K by the relationship of:

$$\underline{K} = \Delta D_{CW}/(D_{CW} * \Delta T_T) \quad (6)$$

The value of the apparent coefficient of stretch $\underline{K}$ is averaged with the prior K value in the table 68 and updates the table values of K to an average value ($K_A$) where $$(K_A) = (K_1 + K_2)/2 \quad (7)$$

and where $K_1$ is the last table value for K; and
$K_2$ is the latest value derived for K.

It can be appreciated that the table will be quickly updated to the correct apparent value of $\underline{K}$ or $K_A$.

The average value $K_A$ (which is ultimately the apparent $\underline{K}$ of the slickline) is utilized in a determination of the change in length $\Delta D_2$ as follows:

$$\Delta D_2 = K D_{CW}/2(C_W * D_{CW}) + K D_{CW}[T - (C_W * D_{CW})] \quad (8)$$

Where $C_W$ is cable weight per foot and is obtained from the table 68.

With the forgoing relationship, the change in length ($\Delta D_2$) due to tension with the tool latched in the well bore is determined precisely for the slickline in use.

It will be noted that the depth calculations $\Delta D_1$ and $\Delta D_2$ have different formula. The reason for this is that a freely suspended tool in a well bore has a uniformly distributed tension values along its length from maximum tension at the surface to minimum tension at the bottom. The tension is a function of the weight of the slickline and the weight of tool. Because of this, the formula for $\Delta D_1$ uses only the depth ($D_{CW}$) and the elastic stretch coefficient $K_A$, the tool weight $W_T$ and the tension divided by two.

When the tool is latched in a location and tension increased on the slickline, the increase in tension represents an increase in stress along the total length of the wireline. To properly calculate elongation ($\Delta D_2$), the additional stress due to the increased tension over the entire length of the wireline must be included along with the distributed stress due to the weight of the wire itself.

Temperature Depth Correction

The change in length of the slickline in the well bore due to downhole temperature is correctable by determining the change in slickline depth or length ($\Delta D_3$) as a function of the temperature in the borehole. The change in slickline depth $\Delta D_3$ due to downhole temperature is determinable from the following relationship:

$$\Delta D_3 = C/2[(F_B+F_S)*D_{CW}] \quad (9)$$

where:
- C = the temperature coefficient of the slickline in FT/FT/Pound/°F.;
- $F_B$ = bottom hole temperature in °F.;
- $F_S$ = surface temperature in °F.; and
- $D_{CW}$ = corrected wheel depth.

In the CPU means 40, the determination of the change in depth $\Delta D_3$ for temperature is determined (See 52) where the values of downhole temperature $F_B$ and surface temperature $F_S$ are selection inputs and a determination is made of the change in length of the slickline as a function of the downhole temperature.

Corrected Depth Measurement

The corrected depth measurement is obtained by algebraically summing the corrected depth value ($D_{CW}$) as determined for the measuring wheel and the change in length ($\Delta D_1$ or $\Delta D_2$) of the slickline based upon the apparent stretch coefficient K or $K_A$ for the slickline (See 55a or 55b).

The summed corrected depth measurement "D" (See 57), the tool weight $W_T$ and the line tension value $T_T$ are supplied to a battery backed storage memory 80. The CPU means 40 is programmed to continuously recalculate $T_T$, $D_{CW}$, $\Delta D_{CW}$, $\Delta T_T$, $K_A$, $\Delta D_3$ and $\Delta D_1$, or $\Delta D_2$ on a periodic time basis. For example, a time interval of 0.1 seconds in the timer function 69 will give a suitable resolution of the calculated values.

Data Read Out

A second, "slave" CPU means 82 (shown in dashed line) is connected to the first CPU means 40. The second CPU means 82 receives the inputs of tension $T_T$ and depth (D) at the periodic time intervals of the first CPU means 40. The second CPU means 82 performs all the routine interfacing to the visual displays and analog meters and transmits "corrected output" pulses to a recorder. It also calculates line speed.

The line speed $S_L$ of the slickline is determined (See 75) from the depth values D as a function of time from a clock 76 and results in a units/second value which is input to the memory 80 and to update functions 84 and 86. The first update function 84 samples the values of line speed ($S_L$), the tension ($T_T$) and depth (D) at periodic time intervals suitable for driving visual displays for tension ($T_T$), line speed ($S_L$) and depth (D). The periodic time intervals should be just great enough to permit visual perception of the display readouts which will optimize the smoothness of the display readings. A time interval of 0.5 seconds has been found suitable.

The visual displays include both analog and digital meters.

The second update function 86 samples the input values of tension ($T_T$), depth (D), and line speed ($S_L$) at periodic time intervals which are suitable for transmitting values with a serial port means to an external computer. The serial ports can be any suitable computer port such as a RS232 and/or an RS422, for example.

The depth D (in pulse per unit of measure format) is shaped (See 87) and output to a recorder means.

The Panel

Figure 3:
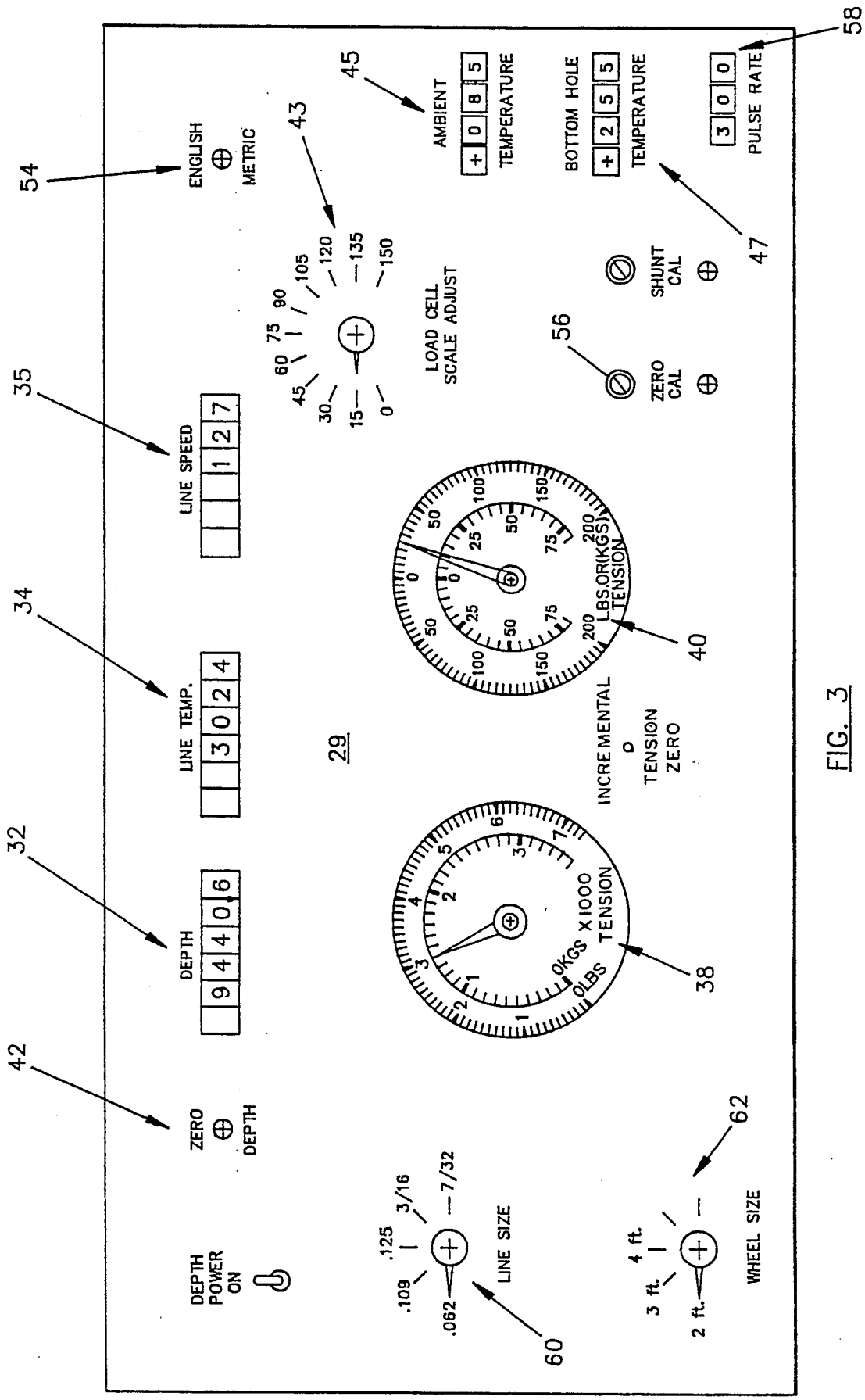
FIG. 3 is a schematic representation of a panel configuration for the present invention.

As shown in FIG. 3, the depth determination system 28 includes a forward face panel 30. Mounted on the face panel 30 is a visual indicator 32 to display depth, a visual indicator 34 to display line tension, and a visual indicator 35 to display line speed. In addition, there is an analog line tension indicator 38 and an incremental line tension indicator 40.

To accommodate the multiple variables involved in slickline operations and to input the variables, there are controls which include:

- A switch 42 which is set to the wireline diameter size to provide an input adjustment for wire size to the system;
- A English or Metric switch 44 to provide an input adjustment for the units displayed;
- a zero depth switch 42 to provide an input adjustment by the operator for "zero" depth;
- a load cell scale adjustment 43 to adjust for the angle "A";
- an ambient temperature input device 45;
- a downhole temperature input device 47;
- an encoder pulse rate switch 48;
- wheel size adjustment switch to provide an adjustment for different wheel sizes;

Variations

Figure 4:
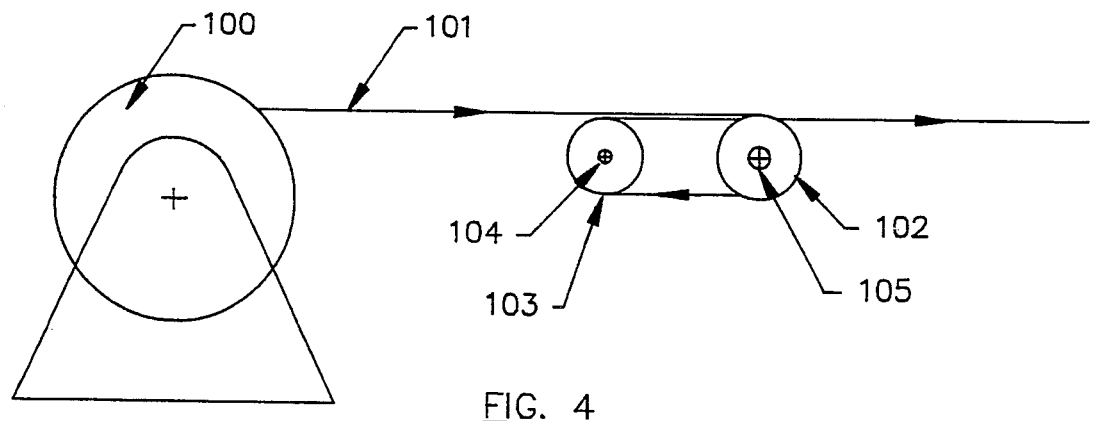
FIG. 4 is a schematic representation of a slickline partially wrapped about a measuring drum.

Referring now to FIG. 4, a spooling drum 100 has a slickline 101 which is partially wrapped about a first measuring wheel 102 and partially wrapped about an second wheel 103. The advantage of the arrangement is that the unit can be contained in a truck with a tension cell 104 on a measuring wheel. Also, two counters 105 can be attached to each wheel which provides a redundancy backup feature for length measurement.

Figure 5:
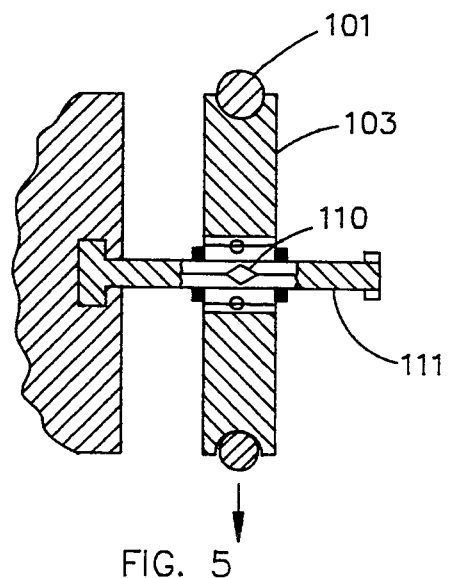
FIG. 5 is a schematic representation of another form of load cell.

As shown in FIG. 5, the load cell 104 can take the form of an electrical bridge 110 in a mounting shaft or axle 111 for a measuring wheel 103. The tension in a slickline 101 produces a moment arm force on the shaft 111 which is measured by the electrical bridge 110 as a function of the shear stress in the mounting shaft. Both the systems of FIG. 4 and FIG. 5 are conventional devices and are illustrated to show alternative structures which can be utilized in the invention.

While the present disclosure describes two CPU means, the system can be incorporated in a single CPU but at an increased cost.

Operation

In operation, the operator first connects up the well tool to the slickline and inserts the tool in the well bore. The tool is located with respect to the well reference zero data point so that a zero depth input is input at the panel and zero's all of the displays to the zero depth reference of the well. The tool weight $W_T$ is determined by measuring tension at the earth's surface when the zero depth input is activated. The tool weight $W_T$ is stored in the memory 80 and available for the operations.

The operator selects the inputs for wheel size, the slickline size, and pulse rate. An input can also be provided to select either English or Metric measurements. The operator determines the ambient temperature and downhole bottom temperature and inputs this data to the system.

The initial value of the coefficient of stretch K is in the table 68 and the tool is run in the well bore. Slickline speeds can be up to 2000 feet/minute. The tension $T_T$ is determined by the load cell while the counter 26 on the measuring wheel determines feet of travel. (As the tool descends into the wheel bore, a determination is made each 0.1 seconds of line speed $S_L$, the tension $T_T$ and the depth D.

The tension determination is corrected for any error due to the load cell positioning by a surface input. The depth D is obtained by correcting the slickline length for changes in length of the slickline due to temperature and to tension.

After the well tool is run the well base, the tool is latched in place in the well bore. This can be accomplished, for example, by use of a conventional pulling tool which engages a locking mandrel fishing neck. When the tool is latched in place, tension is increased slowly in the slickline for a period of time, say 30 seconds. During this time period the line speed $L_S$, the line tension and time are obtained. If jars are in the well tool, the jar movement can easily be detected together with the tension required to trip the jar. During this time period, a repetitive determination is made of the stretch coefficient to obtain the apparent stretch coefficient $\underline{K}$ for the slickline which is an averaged coefficient $K_A$. It will be appreciated that the average coefficient $K_A$ is finitely determined over the period of time. The stretch coefficient $K_A$ can be utilized in determining a more accurate measurement of length changes due to tension.

The tool is then latched and can be accurately positioned with respect to depth where the depth is based upon correction of the slickline for temperature and tension and utilizing the apparent stretch coefficient $\underline{K}$ or $K_A$ for the slickline in use.

With accurate depth measurements, systems can now be used with battery operated memories on a real time basis which can be correlated to the depth.

The visual displays provide a continuous representation of line speed, depth, tension. The line speed, depth and tension are also supplied to modem transmission ports and to a recorder.

It will be appreciated that in some environments, ambient temperature changes may not be a significant factor and in slickline length and in other instances, downhole temperatures may not be a significant factor. Thus, practice of the invention does not necessarily require use of both temperature corrections for correcting the depth measurement. Further, in some instances, the exact accuracy obtained by use of both temperature measurements is not always required by the operator.

It will be apparent to those skilled in the art that various changes may be made in the invention without departing from the spirit and scope thereof and therefore the invention is not limited by that which is disclosed in the drawings and specifications but only as indicated in the appended claims.

I claim:

1. Apparatus for measuring the depth of a well tool in a well bore which traverses earth formations where the well tool is suspended in the well bore by a slickline attached to spooling drum, said apparatus comprising:
   tension measuring means for obtaining a tension measurement of the slickline in the well bore;
   calibrated wheel means in non-slip contact with the surface of slickline for use in obtaining a length measurement of the slickline in the well bore as a function of revolutions of the wheel means;
   depth measurement means coupled to said tension measuring means and to said wheel means for determining the depth of the well tool on the slickline in a well bore as a function of the length of slickline measured by revolutions of the wheel means, the change in length of the slickline due to temperature effects, and the change in length of the slickline due to tension; and
   temperature input means for input of temperature parameters to said depth measurement means.

2. The apparatus as set forth in claim 1 wherein said temperature input means is for an input of ambient surface temperature to said depth measurement means.

3. The apparatus as set forth in claim 1 wherein said temperature input means is for an input of downhole bottom temperature to said depth measurement means.

4. The apparatus as set forth in claim 1 wherein said temperature input means is for an input ambient surface temperature and is for an input of downhole bottom temperature to said depth measurement means.

5. The apparatus as set forth in claim 1 wherein the depth measurement means determines the change in length ($\Delta D_1$) due to tension by the relationship of:

$$\Delta D_1 = KD/2(T + W_T)$$

Where
$\Delta D_1$ is the change in length of the slickline,
D is the depth or length of slickline in the well bore,
K is the elastic stretch coefficient of the slickline,
T is the tension, and
$W_T$ is the tool weight.

6. The apparatus as set forth in claim 5 wherein the depth measurement means determines the stretch coefficient K of the slickline from a table of values of K for a slickline when the slickline is not latched in the well bore and where said table of values is in said depth measuring means.

7. The apparatus as set forth in claim 6 wherein the depth measurement means selectively determines an apparent stretch coefficient $\underline{K}$ for a slickline by utilizing the relationship of:

$$\Delta D_2 = \underline{K}D/2(C_W * D) + \underline{K}D[T - (C_W * D)]$$

where
$\Delta D_2$ is the change in length of the slickline with the tool latched in the well bore
D is the depth,
$\underline{K}$ is the apparent elastic stretch coefficient of the slickline,
T is the tension, and
$C_W$ is the cable weight,
and where the apparent stretch coefficient is determined from the relationship of $$\underline{K} = \Delta D/(D * \Delta T)$$

where
$\Delta T$ is the change in tension in the slickline when the well tool is latched in place in a well bore and tension is applied to the slickline.

8. The apparatus as set forth in claim 7 wherein the depth measurement means updates said table of values of K by the determined values of the apparent stretch coefficient $\underline{K}$.

9. The apparatus as set forth in claim 8 wherein the depth measurement means updates said table by averaging a determined apparent value of $\underline{K}$ with a value of K in the table of values.

10. The apparatus as set forth in claim 2 wherein said calibrated wheel means includes a drum member in which the slickline contacts the circumferential surface of the drum member and changes in diameter of the drum member occur in response to changes in ambient temperature and the drum member measures length of travel of a slickline as a function of revolutions of said drum member and where the change in length of the slickline due to ambient temperature effect on the drum member is algebraically summed in the depth measuring means with a total depth measurement as determined by the revolutions of the drum member.

11. The apparatus as set forth in claim 10 wherein the depth measurement means determines the change in length due to tension by the relationship of:

$$\Delta D_1 = KD/2(T + W_T)$$

Where
$\Delta D_1$ is the change in length of the slickline,
D is the depth or length of slickline in the well bore,
K is the elastic stretch coefficient of the slickline,
T is the tension, and
$W_T$ is the tool weight.
and the change in length due to tension is algebraically summed with the sum of the change in length due to ambient temperature effect and the total depth measurements.

12. The apparatus as set forth in claim 11 wherein the depth measurement means determines the change in length of the slickline due to temperature change in the well bore from the relationship of:

$$\Delta D_3 = C/2[(F_b + F_s)*D]$$

where:
C = the temperature coefficient of the slickline in FT/FT/Pound/°F.;
$F_b$ = bottom hole temperature in °F.;
$F_s$ = surface temperature in °$\Delta$F.; and
D = depth or length of slickline in the well bore.

13. The apparatus as set forth in claim 1 and further including means responsive to travel of the slickline as a function of time for determining slickline speed.

14. The apparatus as set forth in claim 1 and further including means for receiving said tension and said length measurements and for providing a visual display of said measurements and recorder means for recording the length measurements in a well bore for said well tool as a function of time.

15. The apparatus as set forth in claim 1 and further including memory means for recording the length measurements.

16. A method for processing parameters derived from an operation in a well bore where a slickline is moved through a well bore and while a non slip calibrated measuring wheel develops a length parameter representative of the length of slickline traveling over the measuring wheel and while a tension measuring device develops a tension parameter comprising the steps of:
continuously algebraically summing the length parameter while the tool is in the well bore;
continuously developing the tension parameter while the tool is in the well bore;
selecting a temperature parameter relative to a norm for determining the change in length of the slickline due to the temperature differential with respect to the norm and determining the change in length due to the temperature parameter as a function of the temperature coefficient of the temperature parameter and length of slickline in the well bore;
determining the change in length of the slickline as a function of the tension parameter and the length parameter; and
algebraically summing the change in length of the slickline as a function of the tension parameter and the length parameter with the change in length due to the temperature parameter to obtain a length measurement of a slickline corrected for temperature differential and for tension.

17. The method as in claim 16 wherein the temperature parameter includes values both for ambient surface temperature and values for downhole bottom temperature.

18. The method as in claim 15 including selecting a computation for determining the change in length due to tension based upon whether the tool is latched or unlatched in the well bore and when the tool is latched in the well bore, determining the change in length and the change in tension as a function of time and repetitively deriving an apparent coefficient of stretch K for the slickline, and averaging each apparent coefficient of stretch K with a preceding value of a coefficient of stretch for use in determining change in length due to tension.

19. A method for processing parameters derived from an operation in a well bore where a slickline is moved through a well bore and while a non slip calibrated measuring wheel develops a length parameter representative of the length of slickline traveling over the measuring wheel and while a tension measuring device develops a tension parameter comprising the steps of:
continuously algebraically summing the length parameter while the tool is in the well bore;
continuously developing the tension parameter while the tool is in the well bore;
selecting a temperature parameter for the measuring wheel relative to a norm for determining the change in length of the slickline due to a temperature differential with respect to the norm and determining the change in length measurement made by the measuring wheel due to the temperature parameter as a function of the temperature coefficient with the relationship of $$\Delta L = (T_a - K_s)*D*K_w \qquad (1)$$

where
$\Delta L$ is the change in wire length as a function of temperature (feet)
$T_a$ is ambient temperature in °F.
D is the depth in feet
$K_w$ is the temperature coefficient of the selected measuring wheel, FT/FT/°F.
$K_s$ is the wheel standard temperature of calibration used by a manufacturer;
determining the change in length of the slickline as a function of the tension parameter and the length parameter; and
algebraically summing the change in length of the slickline as a function of the tension parameter and the length parameter with the change in length due to the temperature parameter to obtain a length measurement of a slickline corrected for temperature differential and for tension.

20. A method for surface measurements of depth of a well tool in a well bore which traverses earth formations and where the well tool is suspended in the well bore at the end of a slickline attached to a spooling drum at the earth's surface, the method comprising:
  lowering the well tool into the well bore and determining the length of slickline spooled from the spooling drum by a contact non slip measuring wheel to obtain a measurement of length of slickline in the well bore;
  determining the tension in the slickline while the tool is in the well bore;
  determining at least one of the temperature parameters affecting the length of slickline in a well bore; and
  developing corrected measurements of the length of slickline in the well bore by algebraically combining changes in length of the slickline due to tension with changes in length of the slickline due to the temperature parameter with the measurement of the length of slickline in the well bore.

21. The method as set forth in claim 20 wherein a change of length due to a temperature parameter of ambient surface temperature is determined by use of the relationship of:

$$\Delta L = (T_a - K_s) * D * K_w \tag{1}$$

where
  $\Delta L$ is the change in wire length as a function of temperature (feet)
  $T_a$ is ambient temperature in °F.
  D is the depth or length of slickline in feet
  $K_w$ is the temperature coefficient of the selected measuring wheel, FT/FT/°F.
  $K_s$ is the wheel standard temperature of calibration used by a manufacturer.

22. The method as set forth in claim 20 wherein a change of length ($\Delta D_3$) due to a temperature parameter of well bore bottom temperature is determined by the relationship of:

$$\Delta D_3 = C/2[(F_b + F_s) * D]$$

where:
  C = the temperature coefficient of the slickline in FT/FT/Pound/°F.;
  $F_b$ = bottom hole temperature in °F.;
  $F_s$ = surface temperature in °$\Delta$F.; and
  D = depth or length of slickline in the well bore.

23. The method as set forth in claim 21 wherein a change of length ($\Delta D_3$) due to a temperature parameter further includes change of length due to a temperature parameter of well bore bottom temperature which is determined by the relationship of:

$$\Delta D_3 = C/2[(F_b + F_s) * D]$$

where:
  C = the temperature coefficient of the slickline in FT/FT/Pound/°F.;
  $F_b$ = bottom hole temperature in °F.;
  $F_s$ = surface temperature in °$\Delta$F.; and
  D = depth or length of slickline in the well bore.

24. The method as set forth in claim 20 wherein the change of length ($\Delta D_1$) due to tension is determined by the relationship of $$\Delta D_1 = KD/2(T + W_T)$$

Where
  $\Delta D_1$ is the change in length of the slickline,
  D is the depth or length of slickline in the well bore,
  K is the elastic stretch coefficient of the slickline,
  T is the tension, and
  $W_T$ is the tool weight.

25. The method as set forth in claim 21 including the steps of wherein a change of length due to a temperature parameter of ambient surface temperature is determined by use of the relationship of:

$$\Delta L = (T_a - K_s) * D * K_w \tag{1}$$

where
  $\Delta L$ is the change in wire length as a function of temperature (feet),
  $T_a$ is ambient temperature in °F.,
  D is the depth or length of slickline in feet,
  $K_w$ is the temperature coefficient of the selected measuring wheel, FT/FT/°F.,
  $K_s$ is the wheel standard temperature of calibration used by a manufacturer.

26. The method as set forth in claim 25 wherein a change of length due to a temperature parameter of well bore bottom temperature is determined by the relationship of:

$$\Delta D_3 = C/2[(F_b + F_s) * D]$$

where:
  C = the temperature coefficient of the slickline in FT/FT/Pound/°F.;
  $F_b$ = bottom hole temperature in °F.;
  $F_s$ = surface temperature in °$\Delta$F.; and
  D = depth or length of slickline in the well bore.

27. The method as set forth in claim 20 and further including the steps of releasably latching the well tool to the well bore and
  applying tension to the slickline and determining the apparent stretch coefficient $\underline{K}$ for the slickline in the well bore from the relationship of:

$$\Delta D_2 = \underline{K}D/2(C_w * D) + \underline{K}D[T - (C_w * D)]$$

where
  $\Delta D_2$ is the change in length of the slickline with the tool latched in the well bore
  D is the depth,
  $\underline{K}$ is the apparent elastic stretch coefficient of the slickline,
  T is the tension, and
  $C_w$ is the cable weight,
and where the apparent stretch coefficient is determined from the relationship of
  $\underline{K} = \Delta D / (D * \Delta T)$ where
  $\Delta T$ is the change in tension in the slickline when the well tool is latched in place in a well bore and tension is applied to the slickline; and
  releasing the well tool and utilizing the value of $\underline{K}$ for the depth measurements.

28. A method for surface measurements of depth of a well tool in a well bore which traverses earth formations and where the well tool is suspended in the well bore at the end of a slickline attached to a spooling drum at the earth's surface, the method comprising:

lowering the well tool into the well bore and determining the length of slickline spooled from the spooling drum by a contact non-slip measuring wheel to obtain a measurement of length of slickline in the well bore;

determining the tension in the slickline while the tool is in the well bore;

determining at least one of the temperature parameters affecting the length of slickline in a well bore; and latching the well tool in the well bore with the slickline in a an extended condition and determining the apparent coefficient of stretch for the slickline;

releasing the well tool for the well bore and developing corrected measurements of the length of slickline in the well bore by algebraically combining changes in length of the slickline due to tension with changes in length of the slickline due to the temperature parameter with the measurement of the length of slickline in the well bore and utilizing the apparent stretch coefficient K for the slickline.

* * * * *